Patented June 30, 1942

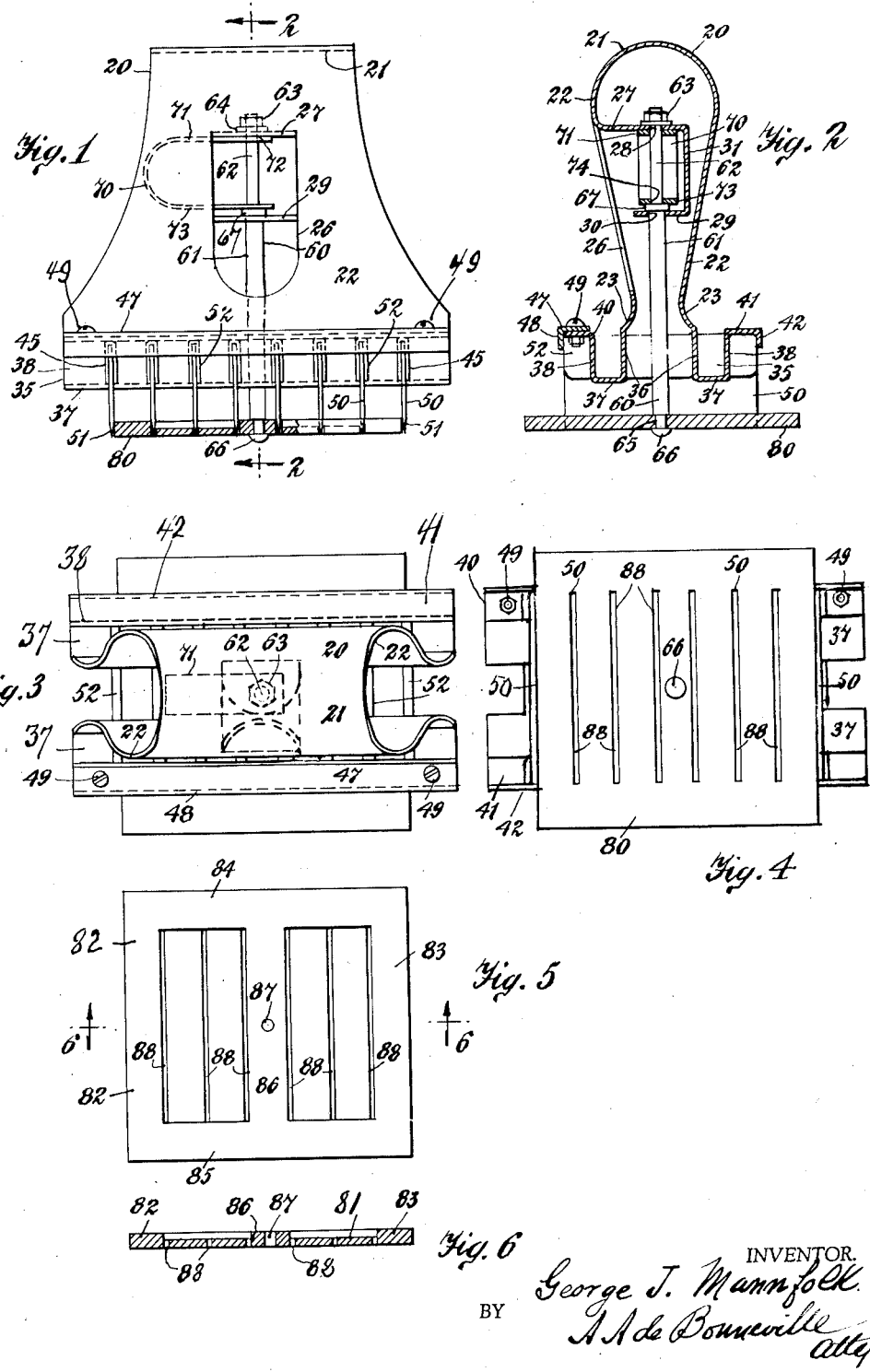

2,288,473

UNITED STATES PATENT OFFICE 2,288,473

CHOPPER AND SLICER

George J. Mannfolk, New York, N. Y.

Application March 7, 1941, Serial No. 382,109

4 Claims. (Cl. 30—128)

This invention relates to chopper and slicer, and is an improvement of the chopper and slicer described in the applicant's Letters Patent of the United States No. 2,198,482 dated April 23, 1940.

The object of the invention is the production of a chopper and slicer which automatically cleans the knives thereof during its operation.

The second object of the invention is the production of a chopper and slicer having knives which can easily and safely be secured in place or detached without employing special tools.

The third object of the invention is the production of a chopper and slicer to cut or slice meat, fruit, vegetables and the like.

In the drawing Fig. 1 represents a side elevation of the improved chopper and slicer; Fig. 2 shows a section of Fig. 1 on the line 2, 2, with portions in full lines; Fig. 3 is a top view of Fig. 1; Fig. 4 represents a bottom view of Fig. 1; Fig. 5 indicates a top view of the cleaning and guide plate of the chopper and slicer and Fig. 6 represents a section of Fig. 5 on the line 6, 6.

A handle for the chopper and slicer is designated in its entirety by the numeral 20, and comprises the curved top end 21, from which extend the longitudinal members 22, which taper toward each other. The lower portions of the members 22 curve outwardly to form the curved portions 23. One of the members 22 is slit and forms the opening 26. The portion slit is bent inwardly to form a support comprising the top normally horizontal supporting member 27 with the opening 28, and the lower parallel member 29 with the opening 30. A normally vertical member 31 at right angles to the members 27 and 29 connects the same.

A supporting housing of the chopper and slicer is designated in its entirety by the numeral 35. The said housing comprises the inner normally vertical portions 36, which extend from the portions 23 of the handle 20. Normally horizontal portions 37 extend from lower ends of the portions 36 and at right angles thereto. Normally vertical portions 38 extend from the portions 37 and at right angles thereto. From one of the portions 38 extends the normally horizontal portion 40 and from the other portion 38 extends the normally horizontal portion 41 with the stop flange 42.

The portions 36 and 38 have formed therein the plurality of slits 45.

Upon the portion 40 is positioned the angular clamping bar having the members 47 and 48. The member 47 is fastened to the portion 40 by the bolts 49 when in operative position.

Knives are indicated with the blades 50 having the cutting ends 51. Hoods 52 are fastened to the upper ends of the blades 50. The said blades are detachably located in position by forcing the hoods 52 through the slits 45, until one end of each hood 52 bears against the stop flange 42. Next the member 48 of the angular clamping bar is positioned against the other ends of the hoods 52, and the member 47 of the clamping bar is fastened to the portion 40 of the supporting housing by means of the bolts 49, to secure the knives in tight operative position.

A longitudinal supporting rod is designated in its entirety by the numeral 60. The rod 60 comprises the main lower cylindrical portion 61, from which extends the upper cylindrical portion 62, somewhat smaller in diameter. At the upper end of the portion 62 is shown the nut 63 and the washer 64. The nut 63 is in threaded engagement with the portion 62. At the lower end of the portion 61 is indicated the portion 65 reduced in diameter with the rivet head 66. A washer 67 encircles the portion 62 of the supporting rod and bears on the shoulder between the portions 61 and 62. A spring is indicated with curved portion 70, the upper arm 71, with the opening 72, and the lower arm 73, with the opening 74. The said spring is located with its arm 71 adjacent to the top portion 27 and its arm 73 bears on the washer 67.

The upper portion 62 of the supporting rod extends through the opening 72 of the upper arm 71 of the spring and the washer 64. The nut 63 maintains the supporting rod in operative position. The main portion 61 of the supporting rod bears on the guide and cleaning plate 80 to be described, and the reduced portion 65 of the supporting rod extends through plate 80 and the rivet head 66 clamps the supporting rod to the said plate 80.

The guide and cleaning plate 80 is rectangular in contour and comprises the body portion 81 which has integral therewith the reinforcing strips 82, 83, 84 and 85 at its outer portions, and the reinforcing strip 86 at its central portion. A circular opening 87 extends through the strip 86. Guide openings 88 parallel to the strips 82 and 83 extend through the body portion 81.

The lower end of the main portion 61 of the supporting rod 60 bears on the strip 86 of the plate 80 and the portion 65 of said rod extends into the opening 87 of the plate 80. The rivet head 66 maintains the said plate 80 in tight operative position.

It will be noted that the lower ends of the hoods 52 of the blades 50 bear on the portions 37 of the supporting housing 35.

Attention is also called to the fact that the blades 50 except those at the ends of the series of blades extend through the guide openings 88 of the guide and cleaning plate 80. The blades 50 at the ends of the series of blades bear against the outer ends of the reinforcing strips 82 and 83, see Fig. 1.

Attention is called to the fact that the spring having the curved portion 70 is spaced from the blades 50, and does not come in contact with the material chopped or sliced.

To use the chopper and slicer, the handle 20 is grasped and the guide and cleaning plate 80 is placed upon the material to be chopped or sliced. Next the user forces down the handle 20 and the blades 50 of the knives pass through and beyond the plate 80. The user then releases the handle 20, and the plate 80 automatically moves outwardly, by virtue of the tension of the spring having the curved portion 70, and the blades 50 and the spaces between them are cleaned.

Various modifications may be made in the invention and the present exemplification is to be taken as illustrative and not limitative thereof.

Having described my invention I claim:

1. A chopper and slicer comprising a handle, a spring supported in the handle, a supporting rod extending into the handle from its lower end and controlled by said spring, knives at the lower end of the handle with their blades extending therefrom and a guide and cleaning plate connected to said rod, said plate having guide openings for the blades of said knives.

2. A chopper and slicer comprising a handle, a spring supported in the handle, a supporting rod extending into said handle and in connection with said spring, a supporting housing at one end of said handle, knives supported by said supporting housing and a guide and cleaning plate connected to said rod and having guide openings for the blades of said knives.

3. A chopper and slicer comprising a handle having a pair of members, one of said members slit to form a support in the handle, said support comprising a top member and a lower member connected by a vertical member, a spring having an upper arm and a lower arm in the handle extending between the members of said support, a supporting rod in said handle extending through openings of the top and bottom members of said support and through openings of the arms of said spring, to be slidably connected to the latter, a supporting housing integral with the handle, a plurality of knives supported in said housing and a guide and cleaning plate having guide openings connected to said rod, the guide openings permitting the blades of the knives to pass therethrough.

4. A chopper and slicer comprising a handle with a pair of members, a support in the handle having a top member and a lower member each with an opening, a spring having an upper arm and a lower arm each with an opening and said arms positioned between the members of the support, a supporting rod in the handle comprising a main lower cylindrical portion and an upper cylindrical portion smaller in diameter, said upper portion extending through the opening of the upper arm of the spring and the opening of the top member of said support and through the opening of the lower arm of the spring, the lower portion of said rod extending through the lower member of the support, a nut at the upper end of the upper portion of said rod adjacent to the upper member of the support and a guide and cleaning plate fastened to the lower end of said rod.

GEORGE J. MANNFOLK.